(12) United States Patent
Everingham (10) Patent No.: US 6,327,611 B1
(45) Date of Patent: Dec. 4, 2001

(54) ELECTRONIC DOCUMENT ROUTING SYSTEM

(75) Inventor: James Everingham, Santa Cruz, CA (US)

(73) Assignee: Netscape Communications Corporation, CA (US)

( * ) Notice: Subject to any disclaimer, the term of this patent is extended or adjusted under 35 U.S.C. 154(b) by 0 days.

(21) Appl. No.: 09/186,474

(22) Filed: Nov. 4, 1998

Related U.S. Application Data (60) Provisional application No. 60/065,356, filed on Nov. 12, 1997.

(51) Int. Cl.[7] .................................................. G06F 13/00
(52) U.S. Cl. ............................. 709/206; 707/10; 709/223
(58) Field of Search .................................... 709/202, 203, 709/206, 219, 224, 227–230, 300; 707/10; 345/329

(56) References Cited

U.S. PATENT DOCUMENTS

| | | | | |
|---|---|---|---|---|
| 5,388,196 | * | 2/1995 | Pajak et al. .......................... | 345/329 |
| 5,812,780 | * | 9/1998 | Chen et al. .......................... | 709/224 |
| 5,848,271 | * | 12/1998 | Caruso et al. ....................... | 709/300 |
| 5,903,723 | * | 5/1999 | Beck et al. .......................... | 707/10 |
| 5,923,848 | * | 7/1999 | Goodhand et al. .................. | 709/219 |
| 5,978,836 | * | 11/1999 | Ouchi .................................. | 709/206 |
| 6,012,083 | * | 1/2000 | Savitzky et al. ..................... | 709/202 |
| 6,076,101 | * | 6/2000 | Kamakura et al. .................. | 709/206 |

\* cited by examiner

*Primary Examiner*—David Wiley (57) ABSTRACT

An electronic document routing system in a computer network environment integrates into the existing framework of the Internet browser using a Multipurpose Internet Mail Extensions (MIME) type. An ordered list with optional rules is placed in a MIME attachment, describes the route, document movement, time allotments, and options for each recipient. An originator creates a document, an ordered list of recipients, and specifies tasks and time allotments for each recipient The originator sends the document to the first recipient; each recipient performs a required task. Upon completion or expiration of the allotted time, the message is routed to the next recipient and a status report containing the current version of the document is sent to the originator. When all recipients have completed their tasks or the route has completed, the final document is sent to the originator. Thus, the originator receives a final document and intermediate versions of the document.

29 Claims, 13 Drawing Sheets

ELECTRONIC DOCUMENT ROUTING SYSTEM

RELATED APPLICATIONS

This application claims the priority from U.S. Provisional Patent Application No. 60/065,356, filed Nov. 12, 1997.

TECHNICAL FIELD

This invention relates to the routing of electronic documents in a computer environment. More particularly, this invention relates to the routing of electronic documents to an ordered list of recipients across a computer network, allowing the originator to keep track of the progress of the electronic document and any modifications made to it by the recipients.

BACKGROUND

In many organizations, it is necessary to route documents from person to person, for review and/or approval, among client computers connected to a computer network. Such routing of electronic documents to a list of recipients has been difficult, if not expensive. One approach routes a document through a central server. The server operates using a proprietary software program that is installed on the server and acts as the hub to a distribution center. The user designates the document and the list of recipients. The server progressively sends the document to each person on the list. Each time a recipient sends the document back to the server, the server increments the recipient list and then forwards the document to the next recipient in the list. When the list has been exhausted, the document is sent to the originator. A primary impediment to successfully completing a document review cycle is that a person who needs to review the document never receives the document, usually because a person before him in the review chain has not forwarded the document.

An alternative to purchasing a specialized software package is to broadcast the document to all of the intended recipients. Each recipient adds their comments or modifications to the document and sends the resulting document back to the originator. The originator must then manually collate all of the modifications into one document.

It would be advantageous to provide an electronic document routing system that does not require a server-based proprietary software application and easily integrates into the client's existing email system. It would further be advantageous to provide an electronic document routing system that automatically performs versioning and collating of the document for the user.

SUMMARY

In one general aspect, the invention provides an electronic document routing system. A program executes in an originator computer to support routing of a document on a computer network. A designation program is configured to designate a plurality of recipient computers, connected to the computer network, to which the document is to be routed. A sending program is configured to send, to a first of the recipient computers, the document and, appended thereto, an indication of the designation such that the document is nominally routed from the first recipient computer to each other recipient computer. A status-receiving program is configured to receive status data from at least some of the designated recipient computers. The status data received from the recipient computers indicates a status of transfer of the document. A status handling program is configured to detect and handle an error condition in the document routing in response to an indication thereof based at least partially on the status data.

In one general aspect, the invention uses an easily configured document routing mechanism that routes documents to an ordered list of recipients, thereby allowing automatic versioning and compositioning through standard electronic mail (email) in a computer network environment. In addition, the invention can use a client-based routing mechanism based on the existing email services of the client's Internet browser.

In one general aspect, the invention easily integrates into the existing framework of the client's Internet browser using a Multipurpose Internet Mail Extensions (MIME) type. An ordered list, with optional rules, are placed in a MIME attachment and describe the route, how the document moves along the route, the time allotments, and specific options based on each person (e.g., if this person does not respond within three hours, then notify the originator, or automatically go to the next person).

The originator creates a document and an ordered list of recipients, and specifies tasks and time allotment options for each recipient in the list. The document is sent out to the first recipient—in one aspect, from the originator's email system. Each recipient normally performs a required task and, when the task is completed or the recipient's allotted time has elapsed, the message is then routed to the next recipient in the list and a status report, perhaps containing the current version of the document, is sent back to the originator. This repeats for each recipient in the list. When all of the recipients have completed their tasks or the route has completed, the finalize document is sent back to the originator.

The originator then has a document that is already collated and composed. The originator additionally has versions of the document for each stage of the modifications.

DESCRIPTION OF DRAWINGS

FIG. 2-1 is a flowchart illustrating the control flow of documents in general terms.

DETAILED DESCRIPTION

As shown in the drawings for purposes of illustration, the invention is embodied in an electronic document routing system for computer network applications. A mechanism according to the embodiment of the invention provides an easily configured document router that uses the existing email functionality of the client's Internet browser, thereby enhancing the services provided by the browser. In contrast, existing document routing programs require the user to purchase a proprietary software package located on a centralized server.

Figure 1:
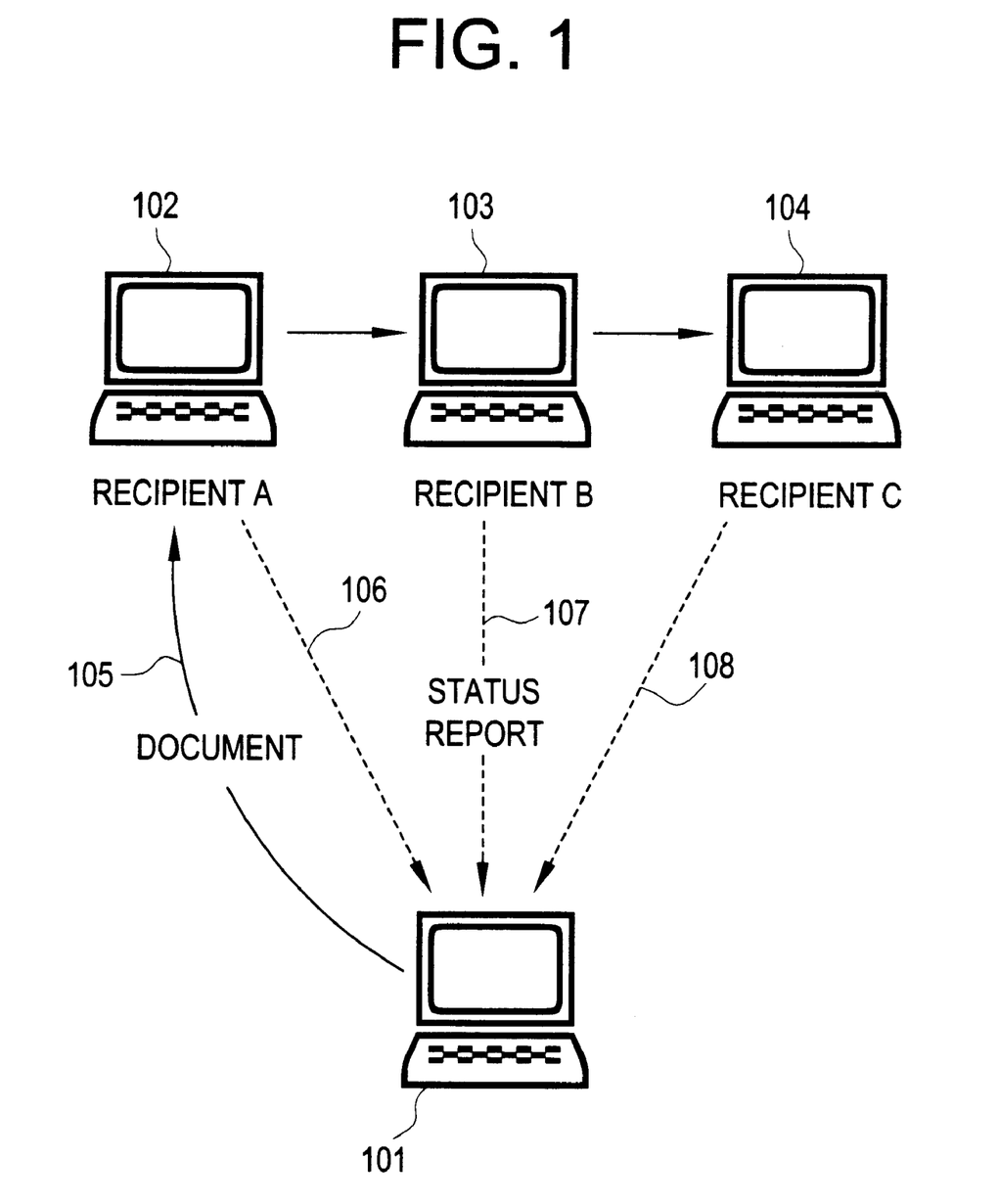
FIG. 1 is a block schematic diagram of an embodiment of the invention operating in a client-based computer network environment.

FIG. 1, shows an example of a client-based solution. The clients route documents using the email function of their Internet browser. A routed document goes out to a list of email recipients in an ordered fashion. The document is routed to the list of people, one at a time, with each recipient adding comments or modifications as the document moves along its route. This works especially well for recipients that do not have access to the originator's corporate server.

A typical example involves status reports. Managers typically have each of the employees that report to them send a status report via email. The manager must then assemble all of the status reports received into one formatted document, add comments, and send the resulting document to the person to whom his manager reports.

In accordance with of the invention, the manager 101 can create one document and an ordered list of recipients (A 102, B 103, and C 104). The document 105 is sent out to the first recipient A 102. Each recipient in turn adds a status to the message and, when the recipient is finished, the message is then routed to the next recipient in the list. Here, when A 102 has completed his task, the document is then routed to the next recipient in the ordered list, which is B 103 in this example. A status report 106 containing the current version of the document is also sent back to the manager 101. This repeats for each recipient in the list. When all of the recipients have added their comments or the route has completed, the document 108 is sent back to the manager 101.

The manager 101 now has a document that is already collated and composed. The document is reviewed, the manager makes final modifications, and sends the finished document to the person to whom the manager reports. The manager additionally has versions of the document available for each stage of the modifications.

In one aspect the invention easily integrates into the existing framework of the client's Internet browser by using a Multipurpose Internet Mail Extensions (MIME) type that clients easily plug into. An ordered list with optional rules are placed in a MIME attachment. It describes the route, how the document moves along the route, the time allotments, and specific options based on each person (e.g., if this person does not respond within three hours, then notify the originator or automatically go to the next person).

Addresses must be ordered to indicate a document route. The address book implements an "ordered list" of addresses (e.g., RFC822 addresses), which is simply an unsorted list of references to address book entries. The list is attached to the routed document and recognized by a special MIME type. The current recipient's email address is matched with the address residing within the attached routing list to obtain position information during the routing operation. Position information is required for the routing component to determine who previously had the document, as well as who to pass it on to after it is reviewed and/or altered.

More generally, a document originates with a document route originator computer 101 of a computer network. Under control of a client program executing on the originator computer 101, the originator computer 101 sends a document 105 to a recipient computer 102. The document includes a content portion and also includes a control portion. Specifically, the control portion includes a list of intended recipients. It is intended that, when a user of recipient computer 102 has completed a review and/or approval of the document, the recipient computer 102, under control of a client program executing on that recipient computer, pass the document on to the next recipient computer designated in the list of intended recipients of the document. In the FIG. 1 example, the next intended recipient after the recipient computer 102 is recipient computer 103. Finally, it is intended that, when the user of recipient computer 103 has completed a review and/or approval of the document, the recipient computer 103 pass the document on to recipient computer 104.

Figure 2:
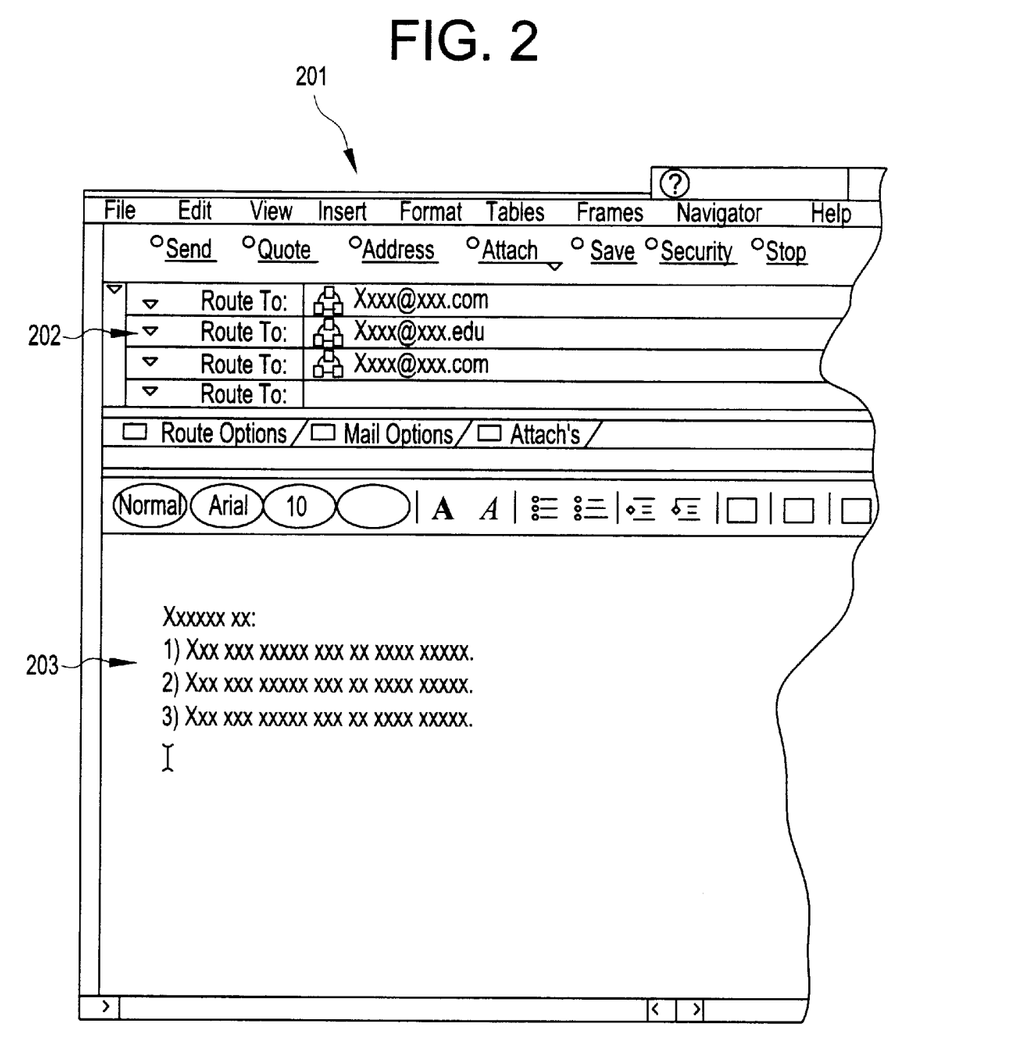
FIG. 2 is a schematic diagram of a document composition window according to the invention.

To facilitate the document routing, the originator computer 101 executes a document routing program. (A program for originating the document routing is discussed later.) A flowchart of one embodiment of the document routing program is shown in FIG. 2. Referring to FIG. 2, while the document is being routed, at step 252, a module of the document routing program receives a status message from one of the recipient computers 102, 103 and 104. Based on the status message (and, perhaps, previously received status messages from that and/or the other recipient computers), it is determined at step 254 if there is an error condition in the document routing among the recipient computers 102, 103 and 104.

If it is determined at step 254 that there is no error condition, then execution returns to step 252 to wait for (or handle) the next status message. On the other hand, if it is determined at step 254 that there is an error in the document routing, namely that the document has not been forwarded by a particular recipient computer by the time the document should have been forwarded to the next recipient computer, then execution goes to step 256 to handle the error. The error condition may occur, for example, because the user of the non-forwarding recipient computer is on vacation, or simply forgets to deal with the document.

In one embodiment, response times are designated by the originator computer 102. At step 2254, to check for an error condition, actual response times (or non-response times) as indicated by the status messages are compared to the orginally-designated response times to determine if the recipient computer should have acted on the document, but did not. In a variation, each recipient computer is given a certain amount of time from receiving the document to complete handling the document before there is considered to be an error and execution is caused to go to step 256.

To handle the error, in one aspect, the processing at step 256 causes the originating computer 101 to send the document to the recipient that should have, but did not, handle the document. In another embodiment, or alternately in the same embodiment, the processing at step 256 causes either the originating computer 101 or another recipient computer 102, 103 and 104 to intervene and perform the review and sending tasks that should have been performed by the recipient computer that did not handle the document For example, at step 256, a dialog box such as the following may be displayed:

Document ###: Status report for xx/xx/19xx

Recipient XXX has not completed his task in his time allotment.

Action:
  Continue on route.
  Perform recipient's action.
  Reassign to: ___.

Figure 3:
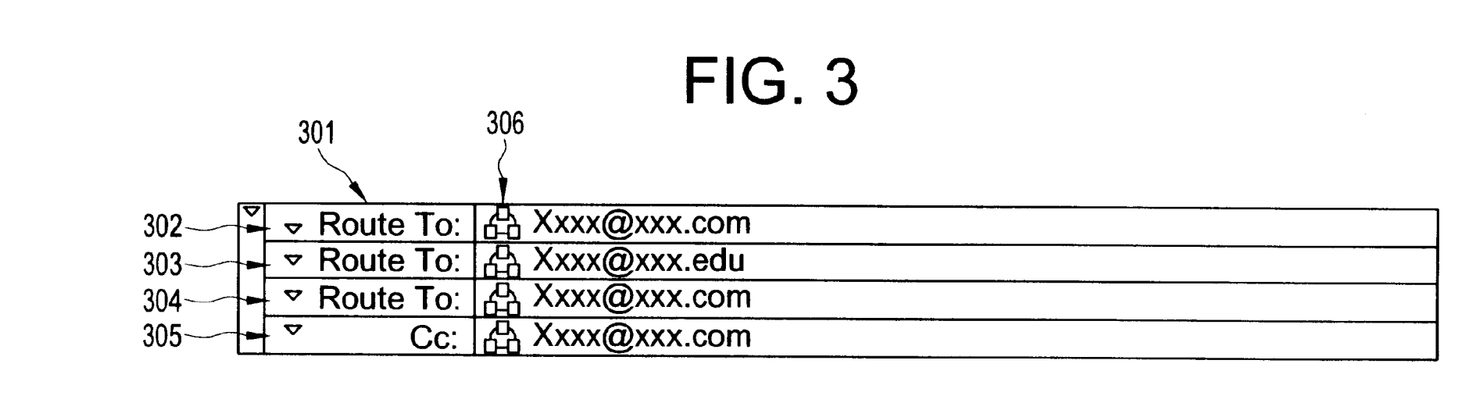
FIG. 3 is a schematic diagram of a recipient routing area of a document composition window according to the invention.

With respect to FIGS. 2 and 3, the originator is presented with a composition window 201. The composition window 201 contains an area for listing the recipients 202 and a message composition area 203. The recipient area 301 allows the originator to designate the recipients 302, 303, and 304 and the order in which the recipients receive the document. A distinct visual cue 306 indicates which recipients are in the route. Recipients are also copied 305 in this area.

Figure 4:
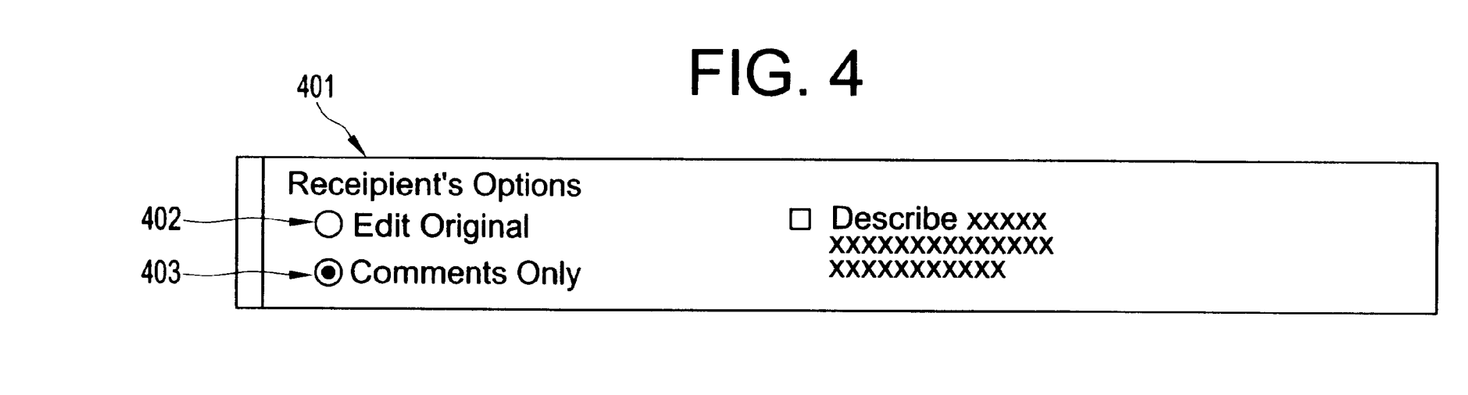
FIG. 4 is a schematic diagram of an area for setting recipient options according to the invention.

Referring to FIG. 4, the originator also selects options for each recipient 401. For example, the originator allows the recipients to edit the original document 402 or add only comments to the original 403. The originator also sets time out preferences for each recipient (e.g., time limit in hours, days, months).

Sending the document begins the routing process. Selecting send first gives any known components a chance at any preprocessing. The document routing component first packages the routing list along with its options into a specific MIME type and sets the "To:" field to the first recipient's address. A hidden filter is created which knows how to deal with the status for this process. Filtering is triggered on a header type, in combination with a unique identifier, that describes the document as a routed document. A folder is created into which status is filtered. Any hidden, specialized filters which are created for the document route are removed upon completion of the route.

The document is sent to the next recipient on the list and also to the originator when a recipient completes a task The originator receives a notification that a recipient has received the document and an update of the current state of the document each time a recipient completes a task. This allows the originator to rebuild the document and resend it to the remaining recipients on the list in case a recipient is not there or the document is lost. The originator can place a comment for each recipient telling the recipient what the assigned task is. Other examples of options include: time allotment (e.g., the document route must run its course by mm/dd/yy or only allow X days/hours/etc. for any recipient to act on); must have this person's input; automatically move the document to the next person if the current person has not responded within his time allotment; or if the person has not responded within the time allotment, then shuffle his name to the end of the list and send it on to the next person.

The originator keeps an internal timer that knows the time allotment for each of the recipients. A timeout indicates that the recipient's machine is unavailable or is not turned on. The originator can manually move the document along by selecting continue, or the document is automatically moved on if that option is selected by the originator.

Figure 5:
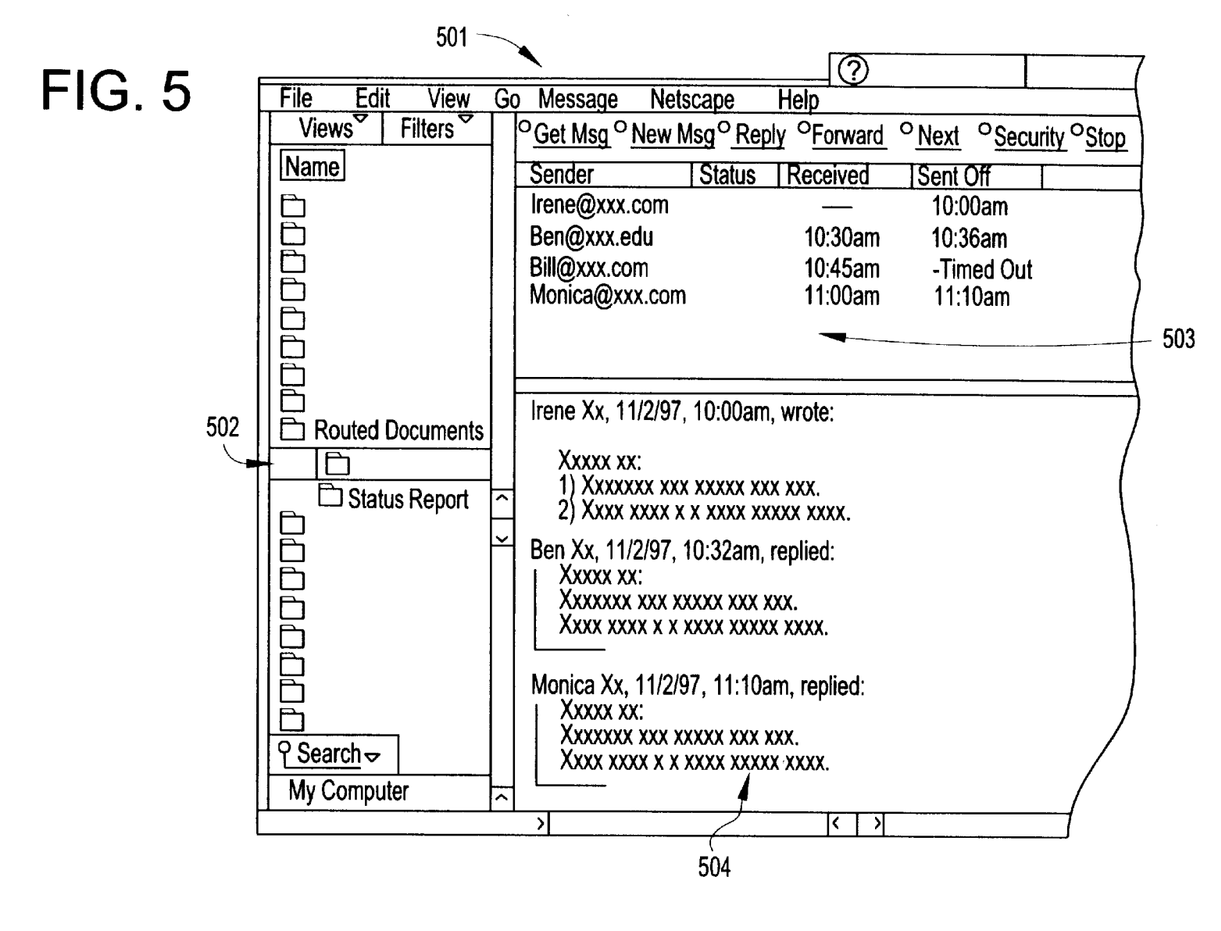
FIG. 5 is a schematic diagram of a status folder display window according to the invention.

With respect to FIG. 5, the originator can, at any time, check the status of the document through a status folder window 501. The window allows the originator to select a status folder 502 and see the list of recipients 503. Each recipient has a status indicating whether they have responded, have been passed over, substituted, or have not yet received the document. A document window 504 allows the originator to check the status of the version of the document at any point along the route.

Figure 6:
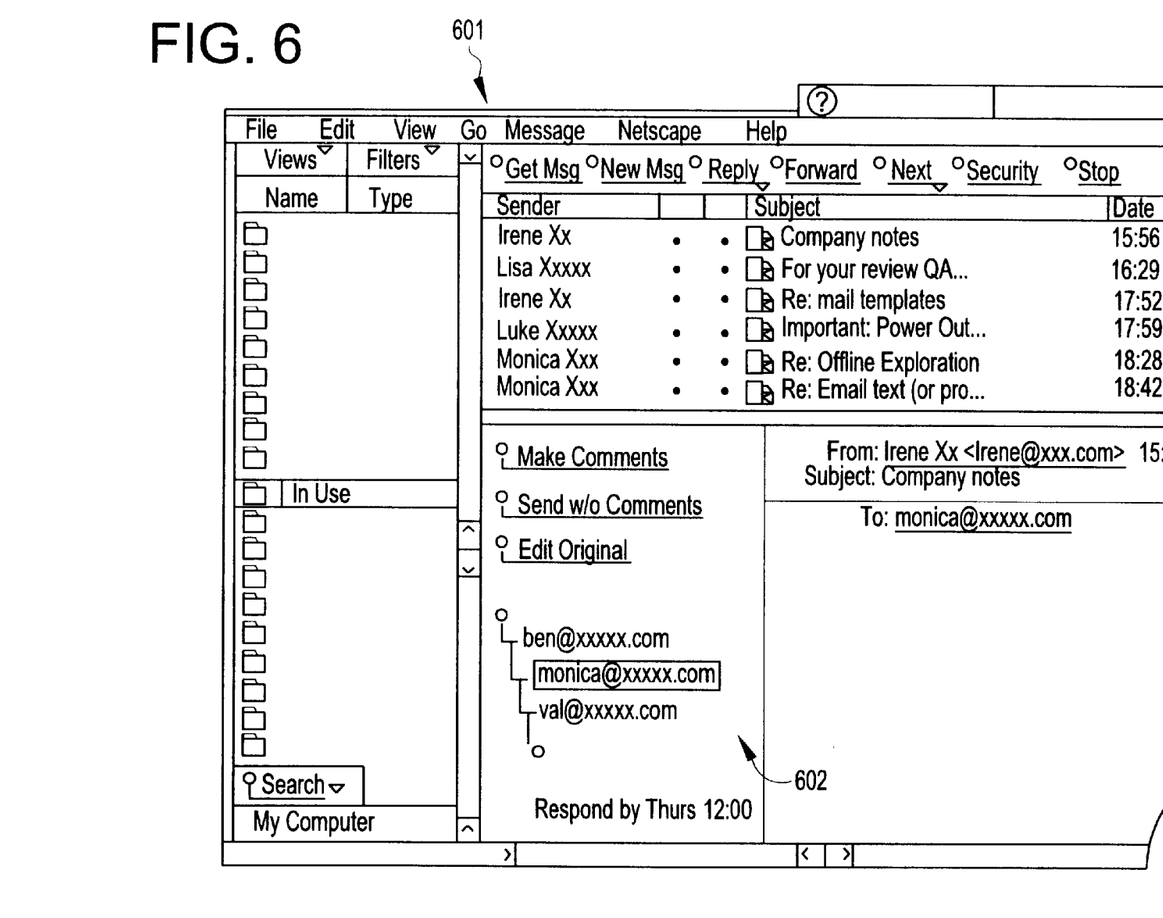
FIG. 6 is a schematic diagram of a recipient inbox message viewer window according to the invention.
Figure 7:
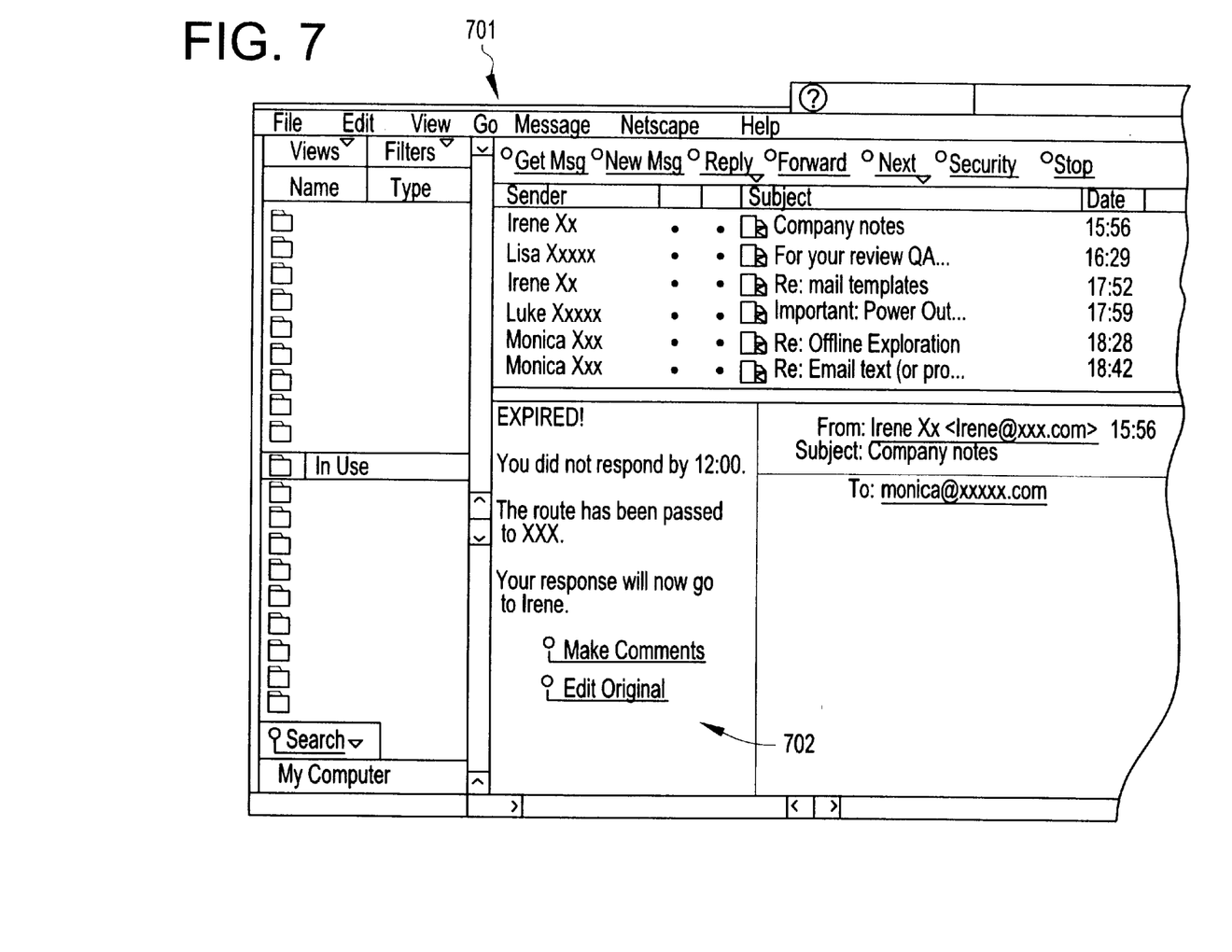
FIG. 7 is a schematic diagram of a recipient inbox message viewer window with an expired time allotment according to the invention.

Referring to FIGS. 6 and 7, the recipient views the document in a mail reader 601. The mail reader 601 sees that the document has the routed document MIME type and displays a status area for the document 602. The status area 602 displays the options available to the recipient or the what the status of the document is if the recipient's time allotment has expired 702.

Figure 8:
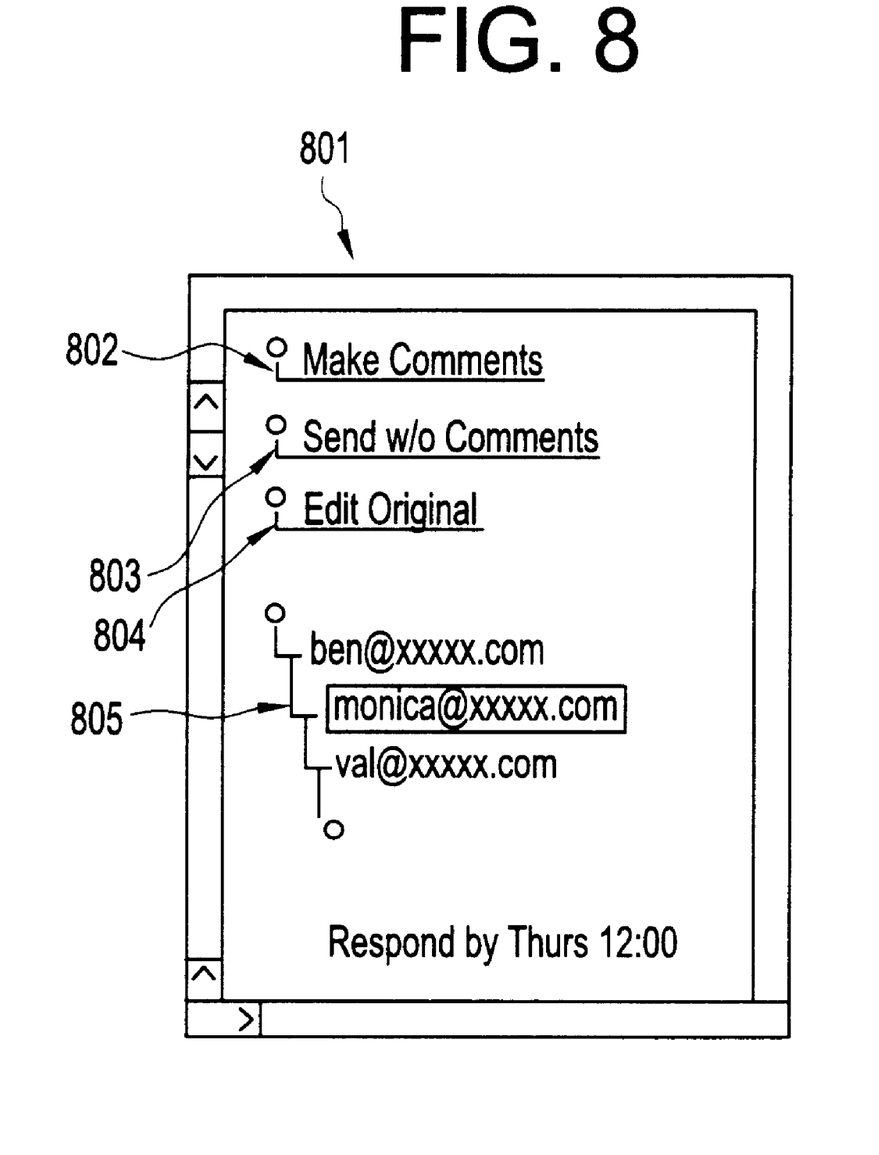
FIG. 8 is a schematic diagram of a status window area of a recipient inbox message viewer window according to the invention.
Figure 9:
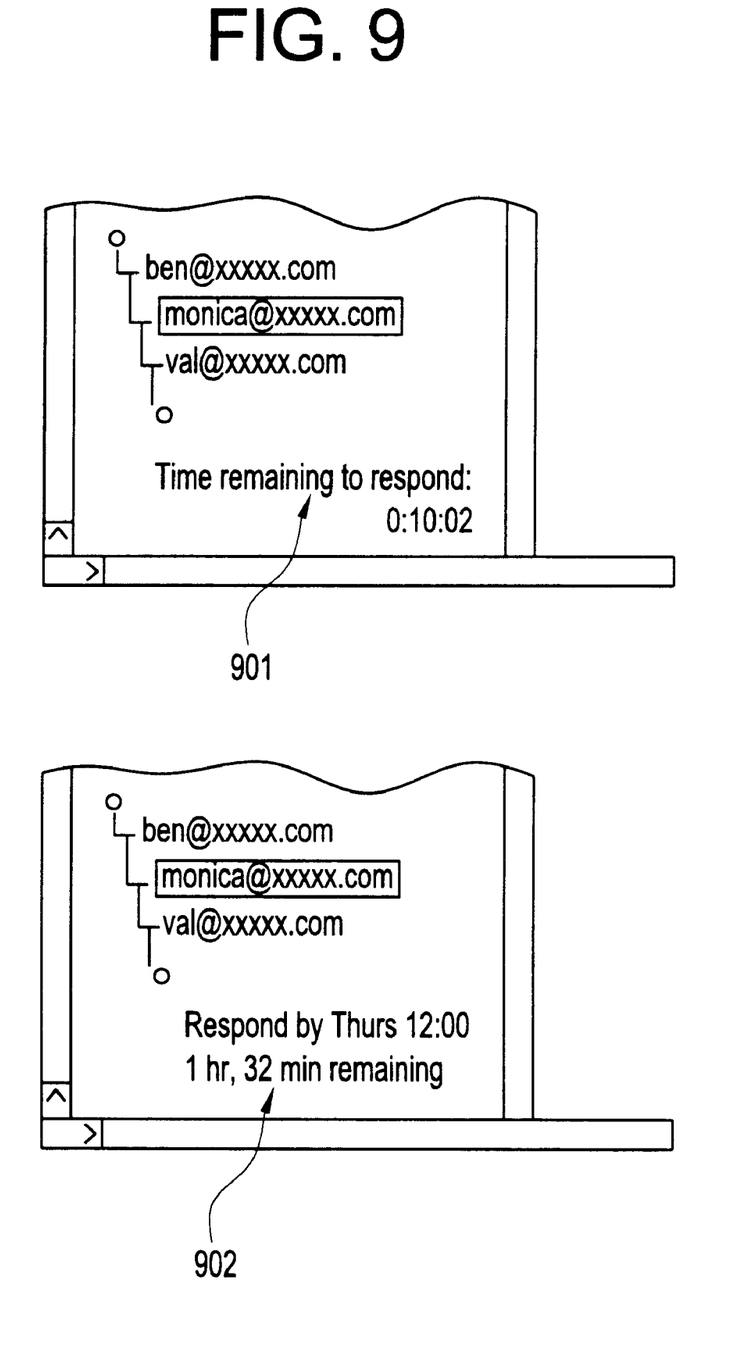
FIG. 9 is a schematic diagram of status windows displaying time remaining and response warning messages according to the invention.

With respect to FIGS. 8 and 9, the status area 801 gives the recipient the option to make comments 802, send the document without comments 803, or edit the original document 804, depending on the options set by the originator. Routing information 805 is also provided in this area. Time remaining indicators 901 and response warnings 902 are displayed to the recipient.

Figure 10:
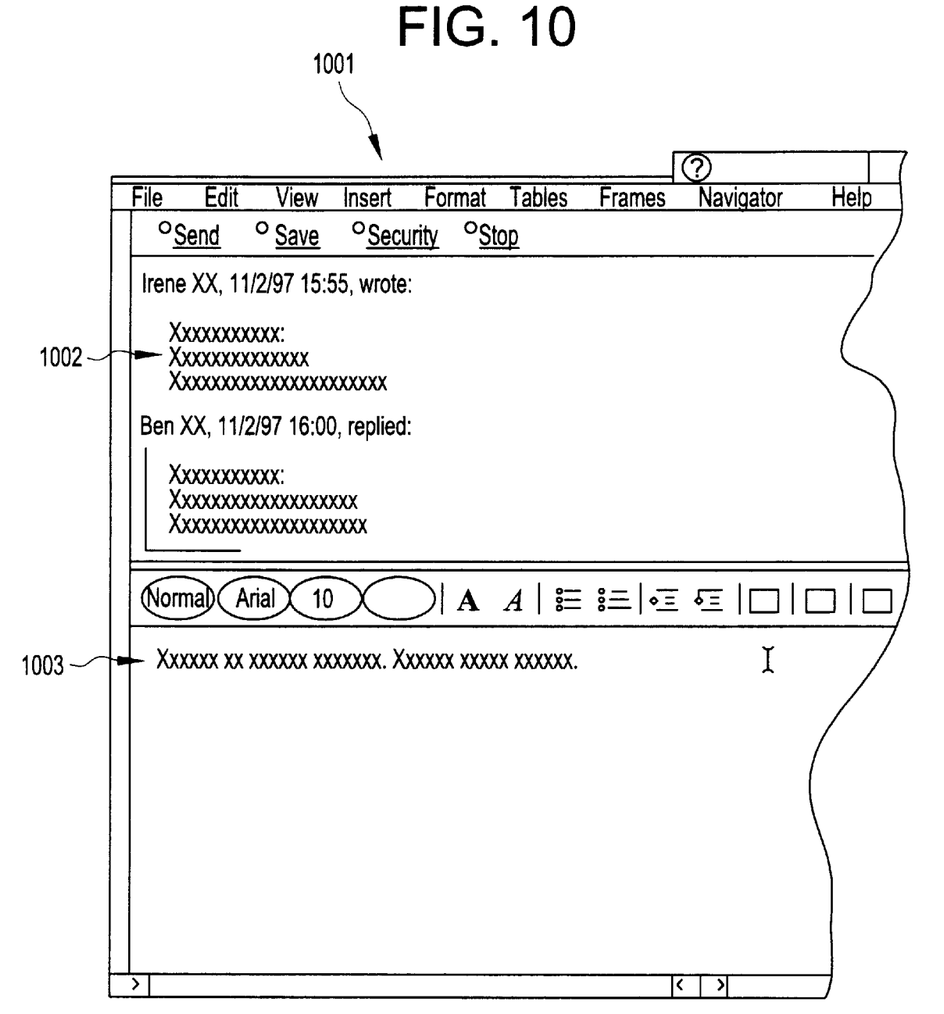
FIG. 10 is a schematic diagram of a recipient editing window for a recipient with comment only privileges according to the invention.
Figure 11:
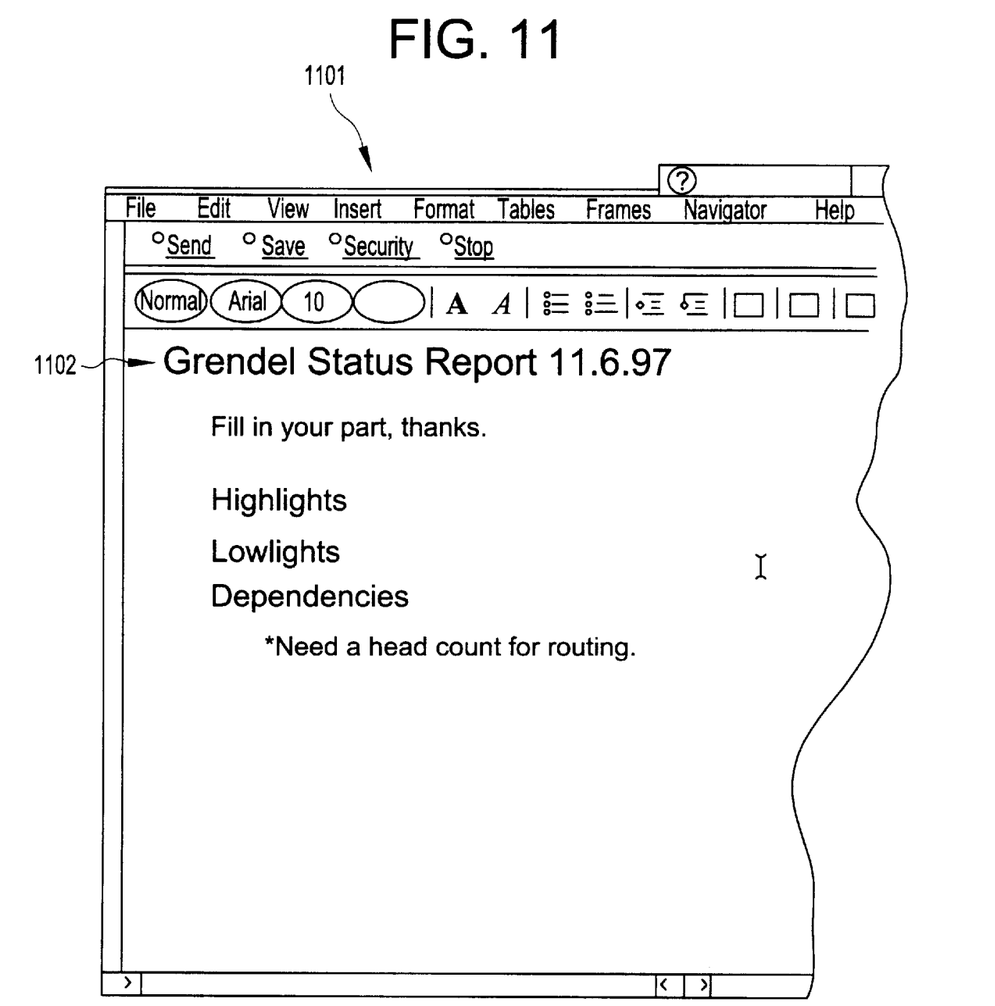
FIG. 11 is a schematic diagram of a recipient editing window for a recipient with document editing privileges according to the invention.

The recipient's ability to edit the document is determined by the originator. Referring to FIGS. 10 and 11, when the recipient is given comment only privileges, the editing window 1001 shows the original, read-only document in a separate area 1002. The recipient enters his comments in another area 1003. If the original document is modifiable by the recipient, then the editing area 1101 allows the recipient to edit the entire text of the original document 1102.

The invention uses the existing email functionality of the client's Internet browser. All of the communication between the originator and recipients and between recipients and recipients is through normal email. The client recognizes a routed document as the invention's MIME type and a custom user interface appears in the mail reader. The client knows from the MIME type how to handle situations, such as the completion of the recipient's task, or the expiration of a time allotment. It automatically sends out two messages, one for versioning and logging, and an aggregate to move on to the next recipient.

Figure 12:
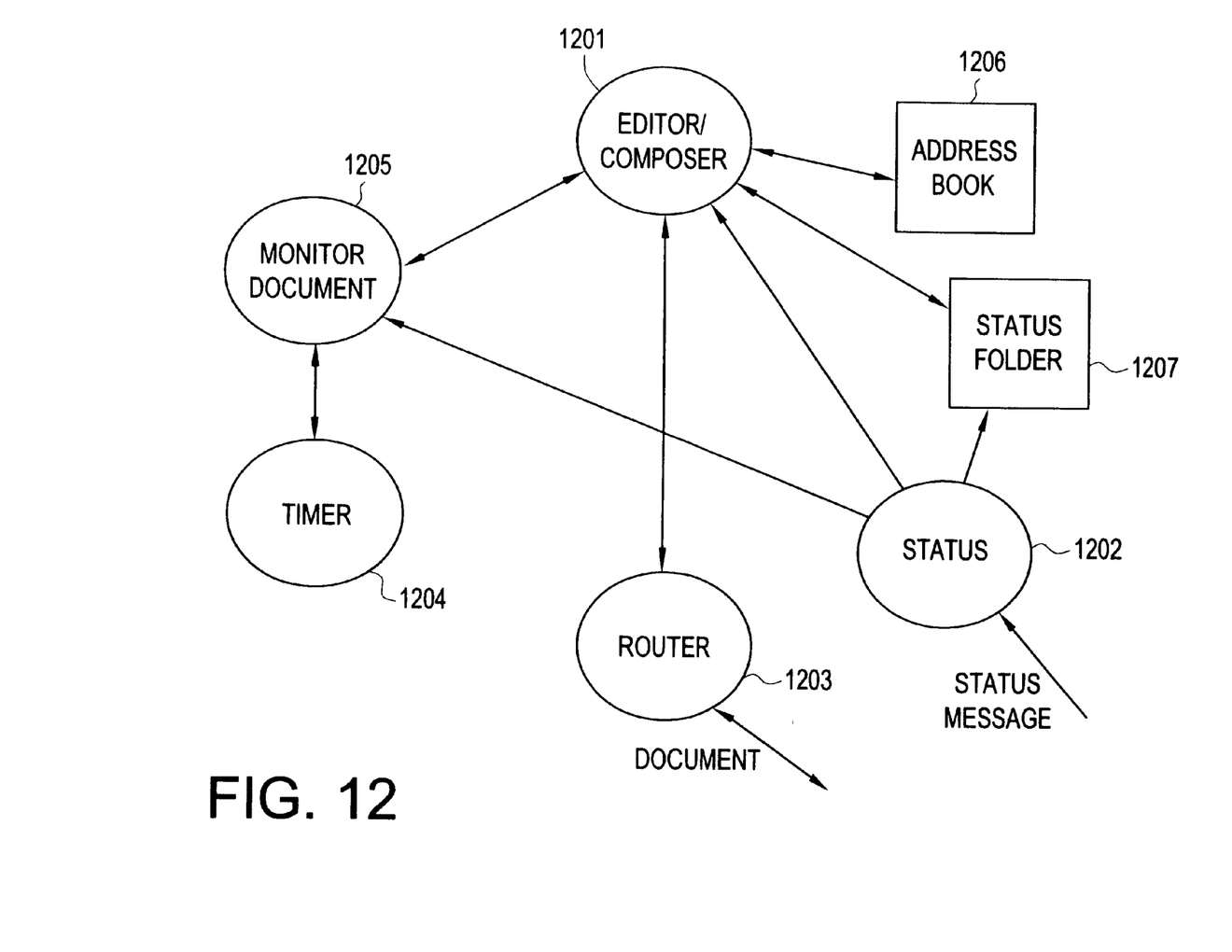
FIG. 12 is a block schematic diagram of a task oriented view of a preferred embodiment of the invention.

With respect to FIG. 12, the editor/composer task 1201 allows the originator to create and compose a document, assign the recipient route using addresses from the address book 1206 or manual entries, and select the task options for each recipient in the route. Any preprocessing of the document is performed here. The document is then sent to the router 1203. The router 1203 sets the "To:" field of the document to the first recipient in the list, attaches the selected options, and sends the document out.

The recipient's router 1203 receives the document and forwards it to the editor/composer task 1201. A status message indicating that the recipient has received the document is sent back to the originator. The editor/composer task 1201 allows the recipient to read and modify the document according to the originator's preferences. The recipient is also notified of the time remaining in a time allotment if one has been assigned. Once the recipient has completed the task, the document is sent to the router 1203. The router 1203 determines the route position by using the current recipient's email address and comparing it to the route list. The next recipient is determined and the document is sent to that person's router 1203. A status message containing the current state of the document is sent to the originator's status task 1202.

If the recipient does not fulfill the task within the allotted time, the monitor document task 1205 is notified by the timer task 1204. The editor/composer 1201 is notified by the monitor document task 1205 that the timeout on a document has expired. The editor/composer task 1201 notifies the recipient of the timeout, sends the document out according to the options selected by the originator, and notifies the originator that a reroute has occurred.

The originator's status task 1202 receives status updates from the recipients and places them into a status folder 1207. The status task 1202 then notifies the editor/composer task 1201 of the arrival of a status message. The editor/composer task 1201 allows the originator to examine and edit the versions of the document or the final composition.

The originator's monitor document task 1205 monitors the outstanding documents and if the timer task 1204 times out on any recipient task, the monitor document task 1205 notifies the editor/composer task 1201 of the timeout. The editor/composer task 1201 notifies the originator of the timeout and performs any of the routing options selected by the originator, sending the document through the router 1203.

Figure 13:
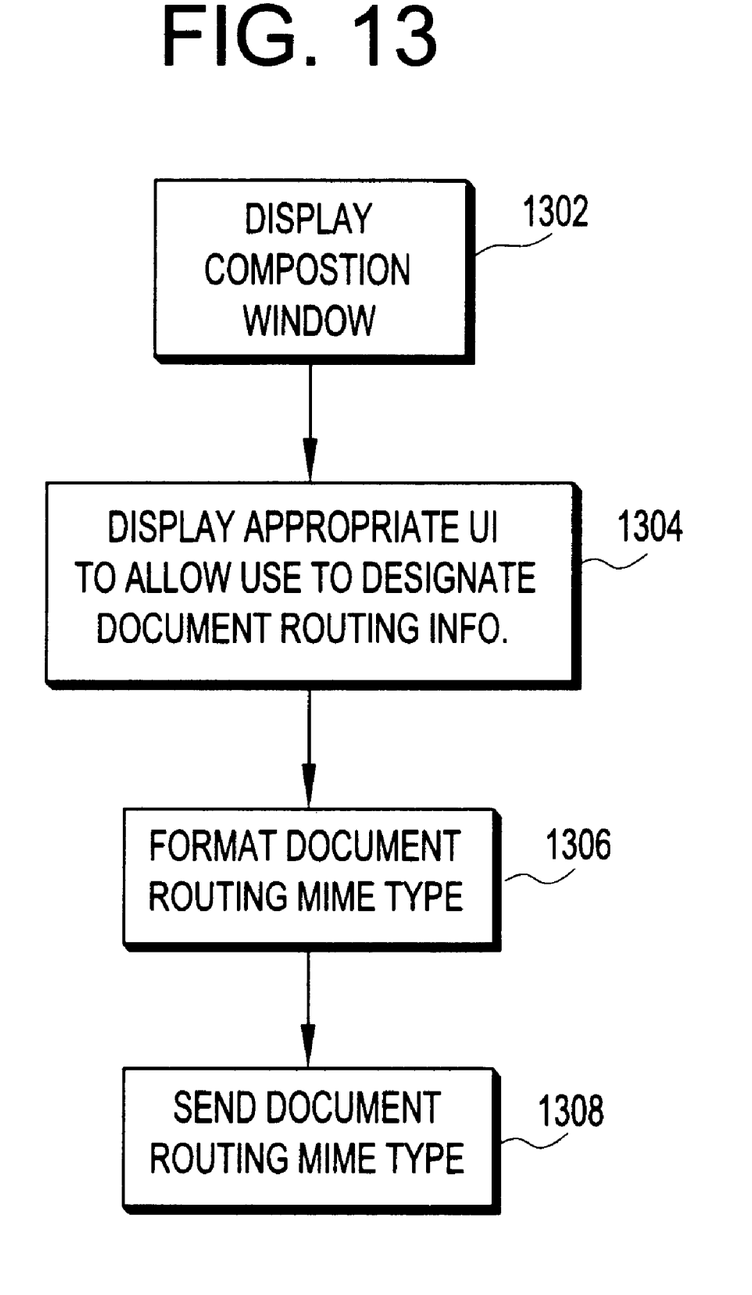
FIG. 13 is a flowchart illustrating control flow for preparing a document for routing.
Figure 21:
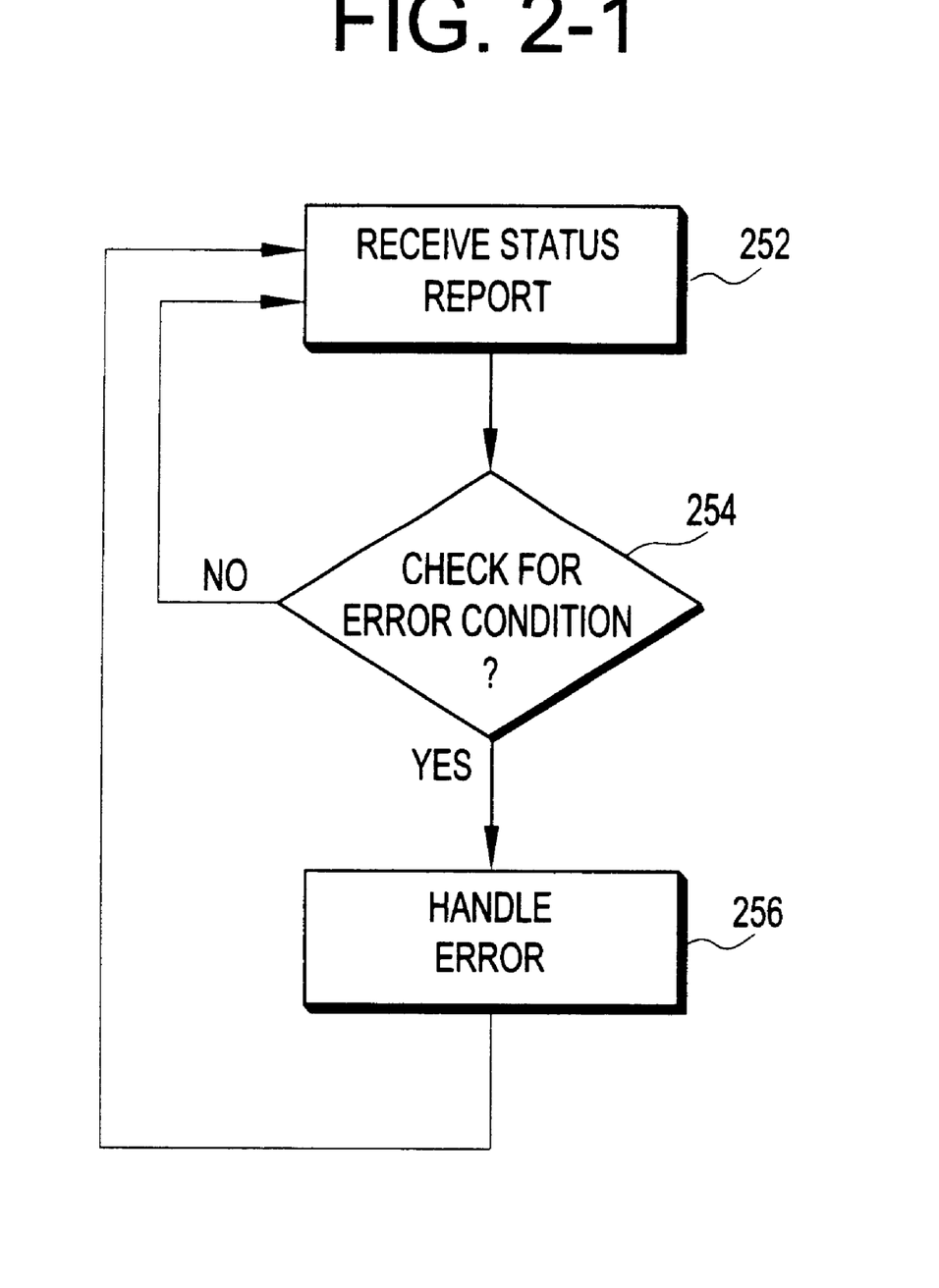

A more generalized process of flow of originating a document, executing in the originating computer 102, is now discussed with return to the flowchart of FIG. 13. Referring to FIG. 13, in one embodiment, a composition window user interface is displayed at step 1302. An indication by the user, made via the composition window, that the document is to be "routed" causes the display of a route designator user interface window (step 1304) whose underlying function is to switch context of the document to be a "routed" document. In one variation, the displayed route designator window is a box with a list of registered components that integrate with the composition window. One of the registered components on the list is "routed document". By the user selecting the "routed document" option, the composition software displays interface elements to complete the composition of the routed document, including composing (or linking into) the document route.

For example, an interface element displayed may be:
Recipient completion allowance __days, __hours
or Complete routing by _/_/_:_
Status: short include complete document
Upon recipient unavailable:
 auto-route to next recipient
 intervene
Upon routing complete
 schedule calendar event
 execute script: ___

In addition, in some aspects, the document routing window is configured to change some of the "standard" composition functionality. For example, the document routing interface may be configured to implement the Iaddresing-Content interface. As another example, the "send" member of the document routing interface functionality may be configured to execute special processing before acally causing the document to be sent from the originating computer 101.

At step 1306, the document routing interface generates the document route by ordering the addresses to which the document is to be sent. In one aspect, the document routing interface attaches the document route to the document, and the resulting document is recognized as a special MIME type, application/document-route. MIME is a well-known specification for formatting non-ASCII messages to be sent over the internet and, particularly, for the use of message header extensions.) In some aspects, each recipient computer adds status information to the document route information in the document indicating, for example, when the document has been received and when the document was passed on. This status information is included in the status messages provided to the originating computer 101 so that the originating computer 101 for use in its error detection and handling functions.

Activation by the user of the "send" software executing on the originating computer begins the actual document routing process, at step 1308. First, any preprocessing is performed as appropriate. Then, the document routing module is executed to package the routing list into a specific MIME type and sets the "To" address to the first recipient's address.

Also, a bidden filter associated with the originating computer 101 is created (or activated) for handling status information that is provided to the originating computer 101 during the document routing process. Preferably, any hidden filter that is so created is removed upon completion of the document routing process. In operation, the filter is triggered upon detecting receipt of a status message identified as originating from a recipient computer as a result of a document routing operation. The filter for each routed document may also be configured to filter status messages only pertaining to the routed document by, for example, recognizing in the status messages an identifier that uniquely identifies the routed document The systems, methods, and techniques here may be implemented in digital electronic circuitry, or in computer hardware, firmware, software, or in combination of them. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a readonly memory and/or a random access memory. Storage devices suitable for tangibly embodying computer program instructions and data include all forms of non-volatile memory, including by of example of semiconductor memory devices, such as Erasable Programmable Read-Only Memory (EEPROM), and flash memory devices; magnetic disks such as internal hard disks and removable disks; magneto-optical disks; and Compact Disk Read-Only Memory (CD-ROM). Any of the foregoing may be supplemented by, or incorporated in, specially designed ASICs (application-specific integrated circuits). Other implementations are within the scope of the following claims.

What is claimed is:

1. A process for electronic document routing to an ordered list of recipients using a client-based system in a computer network environment, the process comprising:

an orignator creating a document;

the originator creating the ordered list of recipients;

optionally creating an internal timer;

the originator optionally selecting a timeout and edit option for each recipient in the ordered list;

the originator defining a task for each recipient in the ordered list;

attaching the options and the tasks to the document;

the originator sending the document to a first recipient in the ordered list; and monitoring the timeout option, if provided, for each recipient in the ordered list using the internal timer.

2. The process of claim 1, the process further comprising preprocessing the document before sending.

3. The process of claim 1, the process further comprising:

notifying the originator when a timeout occurs for a recipient; and allowing the originator to manually reroute the document or, alternatively, automatically rerouting the document if the originator selects an appropriate option.

4. The process of claim 3, wherein allowing rerouting moves a timed out recipient to the end of the ordered list.

5. The process of claim 1, the process further comprising:

receiving the document;

notifying the originator that the document has been received;

displaying the document to the recipient;

allowing the recipient to modify the document according to the options; and notifying the recipient of the remaining time of the recipient's timeout option.

6. The process of claim 5, the process further comprising:

determining a current route position;

sending a current document version to a next recipient in the ordered list; and sending a status message containing the current document version to the originator.

7. The process of claim 5, the process further comprising:

monitoring the recipient's timeout;

notifying the recipient that a timeout has occurred; and re-routing the document according to the options set by the originator.

8. The process of claim 1, the process further comprising:

receiving status updates containing a current document version from each recipient in the ordered list;

placing the status updates into a status folder;

allowing the originator to examine and edit versions of the document in the status folder; and displaying a status of a route to the originator.

9. The process of claim 1, wherein the recipient to adding comments only to the document.

10. The process of claim 1, wherein the edit options allow the recipient to edit the entire document.

11. The process of claim 1, wherein the process is implemented using a Multipurpose Internet Mail Extensions (MIME) type.

12. An apparatus for electronic document routing to an ordered list of recipients using a client-based system in a computer network environment, the apparatus comprising:

a module for creating a document;

a module for creating an ordered list of recipients;

an optional internal timer;

an optional module for selecting a timeout and edit option for each recipient in the ordered list;

a module for defining a task for each recipient in the ordered list;

a module for attaching the options and the tasks to the document;

a module for sending the document to the first recipient in the ordered list;

a module for monitoring the timeout option for each recipient in the ordered list using the internal timer.

13. The apparatus of claim 12, the apparatus further comprising:

a module for preprocessing the document before it is presented to the sending module.

14. The apparatus of claim 12, the apparatus further comprising:

a module for notifying a document originator when timeout occurs for a recipient; and a module for allowing the document originator to manually reroute the document or, alternatively, for automatically rerouting the document if the document originator selects an appropriate option.

15. The apparatus of claim 14, wherein the allowing rerouting module moves the timed out recipient to the end of the ordered list.

16. The apparatus of claim 12, the apparatus further comprising:

a module for receiving the document;

a module for notifying an originator that the document has been received;

a module for displaying the document to the recipient;

a module for allowing the recipient to modify the document according to the options; and a module for notifying the recipient of the remaining time of the recipient's timeout option.

17. The apparatus of claim 16, the apparatus further comprising:

a module for determining a current route position;

a module for sending a current document version to a next recipient in the ordered list; and a module for sending a status message containing the current document version to the originator.

18. The apparatus of claim 16, the apparatus further comprising:

a module for monitoring the recipient's timeout;

a module for notifying the recipient that a timeout has occurred; and a module for re-routing the document according to the options set by the originator.

19. The apparatus of claim 12, the apparatus further comprising:

a module for receiving status updates containing a current document version from each recipient in the ordered list;

a module for placing the status updates into a status folder;

a module for allowing the originator to examine and edit versions of the status folder; and a module for displaying the status of the route to the originator.

20. The apparatus of claim 12, wherein the edit options limit the recipient to adding comments only to the document.

21. The apparatus of claim 12, wherein the edit options allow the recipient to edit the entire document.

22. In a tangible recording medium, a program for implementing a computer implemented process for electronic document routing to an ordered list of recipients using a client-based system in a computer network environment, the program comprising:

creating a document;

creating the ordered list of recipients;

optionally creating an internal timer;

optionally selecting a timeout and edit option for each recipient in the ordered list;

defining a task for each recipient in the ordered list;

attaching the options and the tasks to the document;

sending the document to the first recipient in the ordered list; and monitoring the timeout option, if provided, for each recipient in the ordered list using the internal timer.

23. A program to execute in an originator computer to support routing of a document on a computer network, the program comprising:

a designation program configured to designate a plurality of recipient computers, connected to the computer network, to which the document is to be routed;

a sending program configured to send, to a first of the recipient computers, the document and, appended thereto, an indication of the designation such that the document is nominally routed from the first recipient computer to each other recipient computer;

a status receiving program configured to receive status data from at least some of the designated recipient computers, status data received from the recipient computers indicating a status of transfer of the document; and a status handling program configured to detect and handle an error condition in the document routing in response to an indication thereof based at least partially on the status data.

24. The program of claim 23, wherein the status handling program includes:

an error recovery program configured to handle the error condition by causing the document to be routed to a next designated recipient computer when the status data indicates that the next designated recipient computer has not received the document.

25. The program of claim 23, wherein the status handling program includes:

an alternate routing program configured to cause the document to be routed to a computer not originally designated, in place of a designated recipient computer indicated by the status data as not having acted on the document.

26. The program of claim 24, wherein the status handling program includes a detection program configured to detect whether a particular designated recipient computer has received the document by detecting whether a status message has been received from that designated recipient computer prior to deadline time.

27. The program of claim 26, wherein the deadline time for the particular designated computer is based upon status data received from another one of the designated recipient computers.

28. The program of claim 23, wherein the designation program includes:

an interface program configured to provide a user interface to a user to designate the recipient computers; and an appending program configured to append the indication of the designation of the recipient computers to the document.

29. The program of claim 28 wherein the appending program appends the designation to the document to form at least a portion of a MIME-type document; and the sending program is configured to send the MIME-type document.

* * * * *